United States Patent [19]

Rauhut

[11] 3,974,368

[45] Aug. 10, 1976

[54] CHEMILUMINESCENT DEVICE HAVING LONGER SHELF LIFE

[75] Inventor: Michael McKay Rauhut, Bridgewater T.W.P., N.J.

[73] Assignee: American Cyanamid Company, Stamford, Conn.

[22] Filed: Nov. 11, 1974

[21] Appl. No.: 522,386

Related U.S. Application Data

[63] Continuation-in-part of Ser. No. 314,907, Dec. 13, 1972, abandoned.

[52] U.S. Cl. ................................ 240/2.25; 206/219; 206/803; 206/84; 252/188.3 CL; 428/447; 428/451

[51] Int. Cl.$^{2}$ ..................... F21K 2/00; B65D 25/08; C09K 11/00

[58] Field of Search ........... 252/188.3 CL; 428/447, 428/451; 206/219, 803, 84; 240/2.25; 222/94, 541

[56] References Cited

UNITED STATES PATENTS

| | | | |
|---|---|---|---|
| 2,921,870 | 1/1960 | Baum et al. | 428/451 |
| 3,197,332 | 7/1965 | Champ | 428/451 |
| 3,584,211 | 6/1971 | Rauhut | 252/188.3 CL X |

*Primary Examiner*—Benjamin R. Padgett
*Assistant Examiner*—David Leland
*Attorney, Agent, or Firm*—Charles J. Fickey; Gordon L. Hart

[57] ABSTRACT

Treatment of plastic or metal containers for chemiluminescent light packages by contacting with a chlorosilane, whereby storage stability, and shelf life of fabricated chemiluminescent devices is increased.

5 Claims, No Drawings

CHEMILUMINESCENT DEVICE HAVING LONGER SHELF LIFE

This application is a continuation in part of Ser. No. 314,907, filed Dec. 13, 1972, now abandoned.

This invention relates to a method of treatment for package materials for chemiluminescent light devices whereby the materials are made inert to the chemical reactants which produce the chemiluminescent light.

In U.S. Pat. Nos. 3,511,612, and 3,576,987, are disclosed a number of packaged chemiluminescent light devices. U.S. Pat. No. 3,576,987, in particular discloses a light stick which is an elongated, transparent or translucent flexible outer tube and a ridged, breakable inner tube which runs parallel to the outer tube and which preferably is joined to the outer tube, or relatively fixed at its ends with respect to the inner tube. The inner tube is filled (wholly or in part) with one component of a two-component lighting system. The outer tube is filled with the second component. The outer tube is capped at both ends with a closure which may contain a recess which fits around the inner tube to hold it in place and which, if desired, may serve as a closure for at least one end of the inner tube. Alternatively, the inner tube may be sealed separately and attached to the outer tube at the ends or along the longitudinal side in any convenient way.

To operate the device, the outer, flexible tube is bent causing the inner inflexible tube to fracture and thus mix the two components and initiative light production. The outer translucent tube thus becomes a lighted wand for display purposes.

It is clear that two or more inner tubes could be employed to store separately the components of a three or multiple-component chemical lighting system.

The chemiluminescent system of this invention thus comprises the device as described accommodating the admixture of at least two chemiluminescent components and providing for the admixture in the device of at least two chemiluminescent components comprising either (a) a component containing a chemiluminescent compound and a second component containing a hydroperoxide compound, either or both components containing a diluent, or (b) a dry solid component containing both a solid chemiluminescent compound and a solid hydroperoxide compound and a second component comprising a solvent for said solid chemiluminescent compound and said solid hydroperoxide compound. Any other necessary ingredients for the production of chemiluminescent light, or for lifetime control, or for intensity improvement, or for storage stabilization must of course either be included in one of the two system components or included as additional components. In particular with the preferred oxalic-type chemiluminescent compounds of this invention, a fluorescent compound must be included in the system.

Diaryl and dialkyl oxalates substituted with strong electronegative groups can be used (for examples see U.S. Pat. No. 3,597,362 as the chemiluminescent compound). In general, the greatest light output is expected with oxalates derived from phenols or alcohols which have pKa values lower than 7.0. Examples of suitable compounds are bis(4-nitrophenyl)oxalate, bis(6-carbopentoxy-2,3,5-trichlorophenyl)oxalate (CPPO) or bis(2,4-dinitrophenyl)oxalate.

The same fluorescers that have been described for oxalate —$H_2O_2$ two-component systems (see U.s. Pat. Nos. 3,597,362 and 3,557,233 are suitable here.). Examples include perylene and 9,10-diphenyl anthracene (blue emission); 9,10-bis(phenylethynyl)anthracene (BPEA) and 1-chloro-9,10-bis(phenylethynyl) anthracene (yellow-green); 2-chloro, 9,10-bis(phenylethynyl) anthracene, 1,5-dichloro- and 1,8-dichloro-9,10-bis(phenylethynyl) anthracene (yellow); 5,12-bis(-phenylethynyl)naphthacene and rubrene (red).

suitable organic solvents and rate regulator catalysts are described in U.S. Pat. No. 3,576,987.

Although the oxalate chemical lighting components described above can be formulated to be inherently storage stable, such components generally deteriorate seriously when stored in conventional container materials such as polypropylene and Pyrex glass. This invention describes a process for treating otherwise unsuitable container materials to make them suitable for storage of oxalate chemical lighting system components.

Materials useful for treating the containers are dimethyldichlorosilane; this may be replaced with any other chlorosilane such as $RSiCl_3$, $R_2$, $SiCl_2$, $R_3SiCl$ where R is alkyl or aryl. Moreover a hexaalkyl silazane may be used: $(R_3Si)_2NR$. The passivation treatment is expected to be useful for container materials used for the storage of both oxalate-fluorescer-solvent components and for the storage of hydrogen peroxide, and catalyst components. Moreover, the treatment is useful for all plastic films and extrusions as well as for metals including aluminum, zinc, and tin.

The materials of construction, treatments and results of treatments are described in the following Specific Examples, which are intended to describe the invention but are not intended to be limitative.

EXAMPLE I

Chlorosiliane Passivation Treatment

A quantity of four and a half inch long pieces of ¼ inch ID × ⅜ inch OD polypropylene tubing was immersed for 24 hours in a solution of 0.2 M dimethyldichlorosilane at 50°C. The tubing was then rinsed several times with benzene and immersed in a solution of 10% by volume tertiary butanol in benzene for 24 hours at 50°C. After several rinses with benzene the tubing was dried 48 hours at 50°C. A quantity of ¼ inch plugs of ¼ inch diameter polypropylene rod was given the same treatment.

EXAMPLE II

Hexane Extracted Polyethylene

Pieces of ¼ inch ID × ⅜ inch OD × 4½ inch long linear polyethylene were extracted overnight with hexane Soxhelet extraction apparatus. The extracted tubing was then fabricated into devices as described above.

EXAMPLE III

Oxalate Solution Treated Polypropylene

Pieces of ¼ inch ID × ⅜ inch OD × 4½ inch polypropylene were immersed 24 hours in a solution of 0.04 M TCPO and 0.004 M BPEA in ethyl benzoate at 75°C. The pieces were then rinsed with methanol, dried, and fabricated into devices for testing as described above.

EXAMPLE IV

Oxalyl Chloride Treated Polypropylene

Pieces of ¼ inch ID × ⅜ inch OD polypropylene were soaked 18 hours in a solution of 0.2 M oxalyl chloride in benzene. A rinse with benzene was followed by drying and fabrication into devices as described in previous section.

light. The devices were tested when first fabricated (0 time control) and after 14 days storage at 75°C. Results are summarized in Table I. Data was acquired by an S & M Supersensitive Light Meter specially adapted to a 10 mv strip chart recorder and fitted with a holder for the devices which was in a fixed geometrical relationship to the light meter. Calibration was by comparison with a Hirt-Roberts spectroradiometer.

TABLE I

| Storage Time (days) | Material | Intensity vs. Time (min.)(ft. lbts.) |
|---|---|---|
| O | Control | 11.8 7.2 6.1 5.6 4.9 2.7 |
| 14 | Untreated Polypropylene | too weak to measure |
| 14 | Extracted* Polyethylene | 1.9 0.8 |
| 14 | Chlorosilane treated Polypropylene | 9.4 4.0 3.3 2.9 2.6 1.3 |
| 14 | Oxalate treated Polypropylene | 8.0 3.0 2.6 2.1 1.3 0.0 |
| 14 | Oxalyl chloride treated Polypropylene | too weak to measure |
| 14 | Triton B treated Polypropylene | bright, brief light |

*Hexane extracted.

EXAMPLE V

Triton B Treated Polypropylene

Pieces of ¼ inch ID × ⅜ inch OD × 4½ inch length polypropylene was immersed overnight in 40% Triton B in methanol. After a rinse with methanol and drying, devices were fabricated and tested as previously described.

EXAMPLE VI

Pyrex Passivation Procedure

Pieces of 4 mm × 4 inch Pyrex glass tubing were passivated by the following procedure:

1. Cleaning with $H_2$ $SO_4$ — dichromate solution.
2. Rinse with deionized water to remove cleaning solution.
3. 24 hour storage at 25°C. in 10% NaOH.
4. Rinse with deionized water.
5. 24 hour storage at 25°C. in 35% $HWO_3$.
6. Rinse with deionized water.
7. 24 hour storage at 25°C. in 90% $H_2O_2$.
8. Rinse with deionized water.
9. Dry in oven at 75°C.

EXAMPLE VII

Test Procedure

Devices were fabricated from treated and untreated polypropylene tubing, as described in Examples I to V, by first inserting a treated plug into one end and fusing that end on a hot plate; secondly placing a 4 inch, 4mm passivated Pyrex sealed glass ampule, as treated in Example VI, containing 0.4 ml of 0.45 M $H_2O_2$ and 0.015 M Na Salicylate in 3-methylpentanol into the tube; thirdly, adding 2.0 ml of a solution of 0.036 M bis(2,4,6-trichlorophenyl)oxalate (TCPO) and 0.0036 9,10-bis (phenylethynyl)anthracene (BPEA) in ethyl benzoate to the tube; and, finally placing a treated plug into the open end of the tube and fusing it in place. The device could be activated by flexing the polypropylene outer tubing and causing the inner Pyrex tubing to break, and thus allow the reactants to mix and produce

EXAMPLE VIII

The procedure of Example VII is used except that a 4 inch, 4 mm. passivated Pyrex sealed glass ampule, as treated in Example VI, containing 0.4 ml. of 1.5 M $H_2O_2$ and 0.001 M of sodium salicylate in a mixture of dimethyl phthalate (80 Vol. %) and t-butanol (20 Vol. %) is placed in the tube; and, 2.0 ml. of a solution of 0.133 M bis(2,4,5-trichloro-6-carbopentoxyphenyl)oxalate and).002 M 9,10-bis(phenylethynyl)anthracene in dibutylphthalate is added to the tube before finally placing a treated plug into the open end of the tube and fusing it in place. The device is activated as described in Example VII.

In tests carried out as described in Example VII a device fabricated with untreated polypropylene gives too little light to measure after storage at 75°C. for 14 days. A device fabricated with polypropylene treated with trimethylchlorosilane as in Example I provides substantial light emission after storage for 14 days at 75°C.

I claim:

1. In a chemiluminescent device comprising a translucent polypropylene container containing at least two separated components for making a chemiluminescent mixture within said tube, one of said components comprising an oxalate diester and a fluorescer in organic solvent contacting the inner surface of said polypropylene container, the improvement wherein the inner surface of said polypropylene container is passivated by contacting said surface with a chlorosilane having at least one alkyl or aryl substituent.

2. An improved device according to claim 1 wherein said oxalate diester is a bis(phenyl)oxalate ester.

3. A device according to claim 2 wherein said oxalate ester is bis(2,4,5-trichloro-6-carbopentoxyphenyl) oxalate.

4. A device according to claim 1 wherein said silane is dimethyldichlrorsilane.

5. A device according to claim 1 wherein said container is treated by immersing in a solution of said chlorosilane.

* * * * *